March 11, 1952 R. S. PYLE 2,589,134
VARIABLE SEALED CONDENSER
Filed April 26, 1950 2 SHEETS—SHEET 1

INVENTOR.
ROSS S. PYLE
BY
Marvin Moody
Attorney

March 11, 1952 R. S. PYLE 2,589,134
VARIABLE SEALED CONDENSER
Filed April 26, 1950 2 SHEETS—SHEET 2
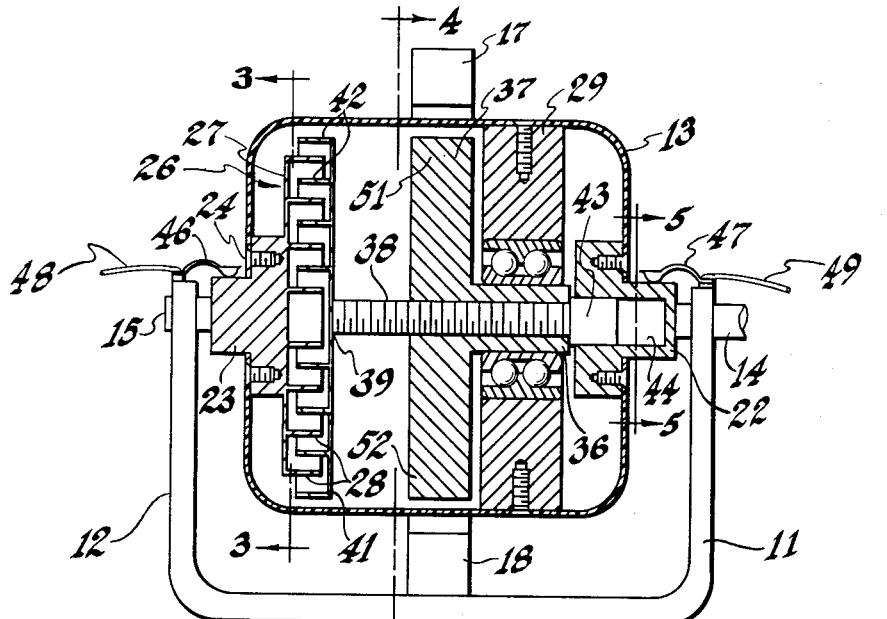
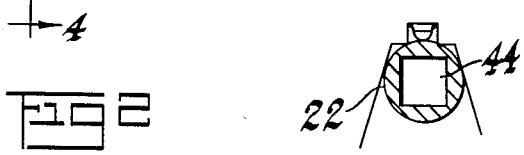
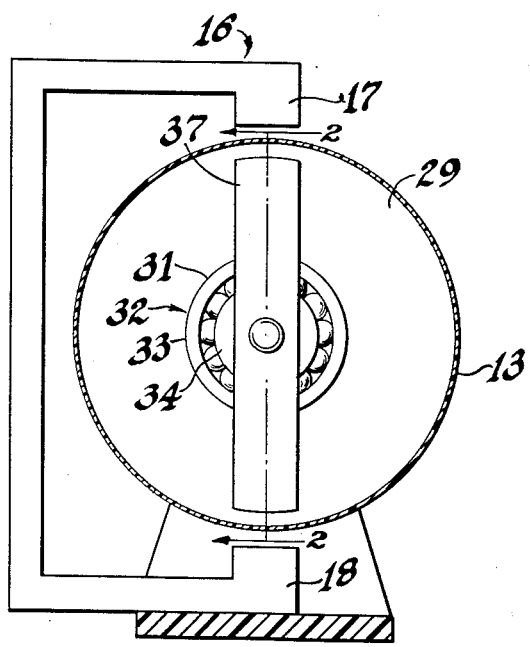
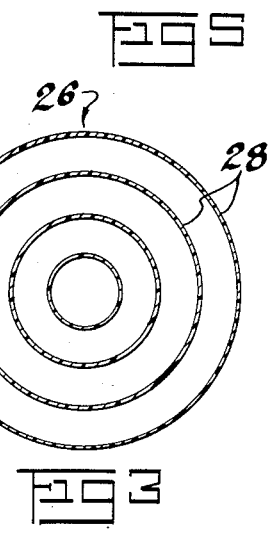
INVENTOR.
ROSS S. PYLE
BY
Marvin Moody
Attorney Patented Mar. 11, 1952

2,589,134

UNITED STATES PATENT OFFICE 2,589,134

VARIABLE SEALED CONDENSER

Ross S. Pyle, Cedar Rapids, Iowa, assignor to Collins Radio Company, Cedar Rapids, Iowa, a corporation of Iowa Application April 26, 1950, Serial No. 158,223

2 Claims. (Cl. 175—41.5)

1

This invention relates in general to vacuum sealed condensers and in particular to a rotary sealed condenser which may be adjusted by external magnetic means.

The capacitance of a capacitor varies with atmospheric conditions. Changes in humidity, temperature, and pressure result in capacity change.

To minimize these capacitance changes, sealed condensers have been built wherein the plates of the condenser are maintained within a sealed chamber. At times it becomes desirable to have a vacuum sealed condenser in which the capacitance may be varied. This requires a change in the relative position of the condenser plates and external means must be provided for varying the relative position of the plates.

It is an object of this invention, therefore, to provide a vacuum sealed condenser in which the capacitance may be varied by rotating a shaft externally of the vacuum chamber.

Another object of this invention is to provide a tunable vacuum sealed condenser which may be tuned quickly and accurately by external magnetic means.

A feature of this invention is found in the provision for a pair of condenser plates which are mounted in a vacuum sealed chamber with one of the plates having a threaded shaft extending out therefrom and received in a threaded collar having a transverse magnetic portion. The vacuum sealed condenser is rotatably supported in a frame and magnetic means are mounted adjacent the sealed condenser to hold the transverse magnetic portion as the vacuum sealed condenser is rotated.

Further objects, features, and advantages of this invention will become apparent from the following description and claims when read in view of the drawings, in which:

Figure 2 is a sectional view taken on a line 2—2 of Figure 4;

Figure 3 is a sectional view taken on a line 3—3 of Figure 2 showing one of the condenser plates;

Figure 4 is a sectional view taken on a line 4—4 of Figure 2; and

Figure 5 is a sectional view taken on a line 5—5 of Figure 2.

Figure 1:
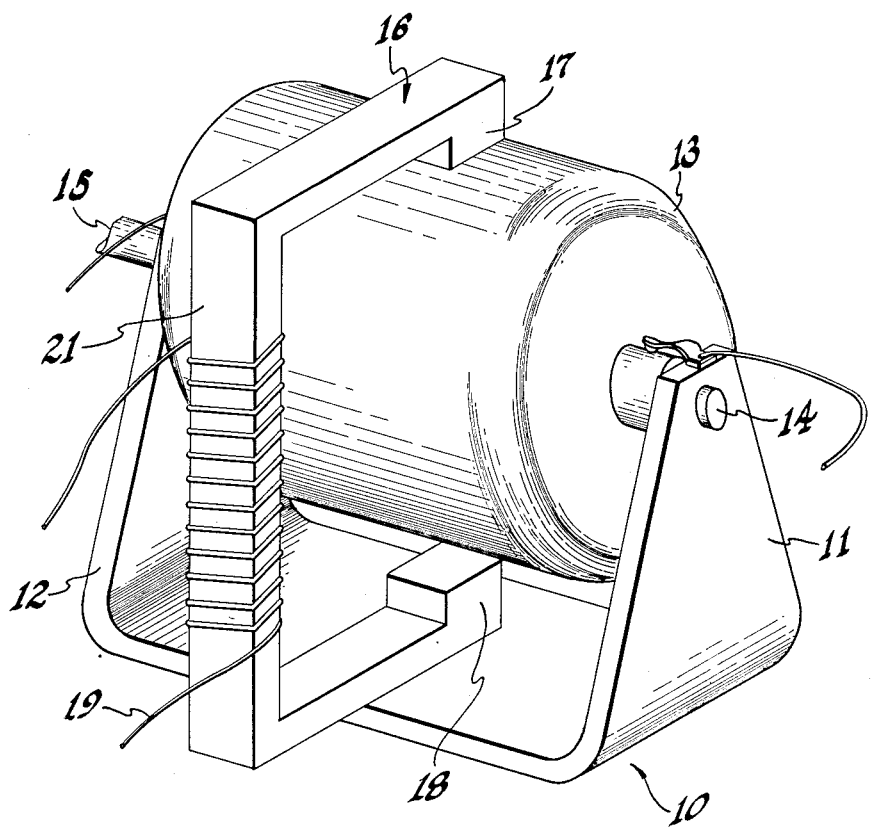
Figure 1 is a perspective view of the variable vacuum sealed condenser of this invention.

Figure 1 illustrates a generally U-shaped frame member 10 which has the upright end members 11 and 12. A sealed cylinder 13 is rotatably mounted between the ends 11 and 12 by the shafts 14 and 15 which are rotatably supported in the

2 ends 11 and 12. A magnet 16 of a generally C shape is mounted on the frame 10 and extends partially about the cylinder 13. Pole faces 17 and 18 extend inwardly toward the cylinder 13 and terminate closely adjacent its outer surface. A conductor 19 is coiled about the center leg 21 of the magnet to induce magnetic flux therein. It is to be understood, of course, that a permanent magnet may be used instead of the electromagnet shown.

Figure 2 shows a sectional view through the cylinder 13. The shaft 14 connects to a collar 22 which is in turn connected to the cylinder 13. The shaft 15 is connected to a collar 23 which is also connected to the cylinder 13. The collars 22 and 23 are connected to the cylinder 13 by holding means 24 which may be, for example, screws.

Connected to the inner end of the collar 23 is a condenser plate 26. The plate 26 comprises a disc shaped back 27 and a plurality of outwardly extending concentric fins 28. A disc 29 is mounted transversely of the cylinder 13, as shown in Figure 4 and is formed with a central opening 31 in which is mounted the bearings 32. The outer race-way 33 of the bearing 32 is connected to the disc 29 by making a force fit. The inner race-way 34 of the bearing 32 is formed with a central opening through which a shoulder 36 is received in a force fit. The shoulder 36 is attached to a transverse rod 37. The ends of rod 37 terminate adjacent the inner wall of cylinder 13. The rod 37 and shoulder 36 are formed with with a radial threaded opening for receiving the shaft 38. One end 39 of the shaft 38 is connected to a second condenser plate 41 which has a plurality of concentric fins 42 that mesh between the fins 28 of the condenser plate 26. The opposite end of shaft 38 terminates in a portion 43 which has a square cross-section that is received in a guide-way 44 formed in the collar 22. The portion 43 prevents shaft 38 from rotating relative to the collar 22.

The cylinder 13 is evacuated and sealed. The cylinder 13 should be made of non-magnetic and non-conducting material, as for example, bakelite. The bracket 10 should be a non-conductor or insulated from shafts 14 and 15. A brush contact 46 is connected to the end 12 and engages the collar 23. Similarly, a brush 47 is mounted on the end 11 and engages collar 22. Leads 48 and 49 respectively are connected to the brushes 46 and 47 for removing the output.

When the magnet 16 is energized, the rod 37 will align so that its ends 51 and 52 will be as close as possible to the ends 17 and 18 of the magnet. If the shaft 14 is rotated, thus turning the cylinder 13, the rod 37 will remain stationary thus causing the plate 41 to move longitudinally relative to the plate 26. This results in a change in capacity between the leads 48 and 49.

It is to be understood, of course, that the magnet 16 may be rotated relative to the cylinder 13 and the same results will be obtained.

It is seen that this invention provides means for varying the capacitance of a vacuum sealed condenser.

Although particular embodiments have been decribed, changes and modifications are within the full intended scope of the invention as defined by the appended claims.

I claim:

1. A vacuum sealed condenser comprising, a hollow container constructed of insulating material, a holding bracket, a first shaft rotatably supported in one end of said holding bracket, a second shaft rotatably supported in the other end of said holding bracket, said container supported between said first and second shafts, a third threaded shaft within said container and slidably connected to said first shaft, first capacitive means mounted upon the end of said second shaft within said container, second capacitive means mounted on the end of said third shaft, a magnetic bar rotatably supported in said container, said third shaft threadedly received through said magnetic bar, and magnetic means coupled to said magnetic bar.

2. Means for varying the capacitance of a vacuum sealed condenser comprising an upright support, a first collar rotatably supported in one end of said support, a second collar rotatably supported in the opposite end of said support, a vacuum sealed container constructed of insulating material fitting about said first and second collar, first capacitive means mounted on the internal end of said first collar, a magnetic member rotatably supported internally of said container, second capacitive means within said container, an extending portion of said second capacitive means threadedly received through said magnetic means, a guide formed in the internal end of said second collar, and said extending portion received therein, and external magnetic means about said container magnetically coupled to said internal magnetic means.

ROSS S. PYLE.

REFERENCES CITED

The following references are of record in the file of this patent:

UNITED STATES PATENTS

| Number | Name | Date |
| --- | --- | --- |
| 1,557,725 | Proctor | Oct. 20, 1925 |
| 1,625,330 | Pinkus | Apr. 19, 1927 |
| 2,438,931 | Litton | Apr. 6, 1948 |